July 23, 1963 W. LOTTER 3,098,477
BROILER
Filed Aug. 11, 1960 5 Sheets-Sheet 1

INVENTOR.
WILLIAM LOTTER
BY
Eugene C. Knoblock
ATTORNEY

July 23, 1963

W. LOTTER 3,098,477

BROILER

Filed Aug. 11, 1960

INVENTOR.
WILLIAM LOTTER

BY Eugene O. Knoblock

ATTORNEY

July 23, 1963   W. LOTTER   3,098,477
BROILER

Filed Aug. 11, 1960   5 Sheets-Sheet 4

INVENTOR.
WILLIAM LOTTER
BY Eugene C. Knoblock
ATTORNEY

July 23, 1963 W. LOTTER 3,098,477
BROILER

Filed Aug. 11, 1960 5 Sheets-Sheet 5

INVENTOR.
WILLIAM LOTTER
BY Eugene C. Knoblock
ATTORNEY

United States Patent Office 3,098,477
Patented July 23, 1963

3,098,477
BROILER
William Lotter, South Bend, Ind., assignor to South Bend Range Corporation, South Bend, Ind., a corporation of Indiana
Filed Aug. 11, 1960, Ser. No. 49,077
18 Claims. (Cl. 126—41)

This invention relates to improvements in broilers for broiling meat.

The primary object of the invention is to provide a novel gas-fired broiler utilizing a gas burner from which a 100% primary gas-air mixture issues through an apertured ceramic plate and burns in a manner to produce direct radiated infra red rays as a means for rapidly broiling meat with its meat juices seared therein.

A further object is to provide a gas-fired direct radiating type of double deck broiler in which the burner is supplied solely with atmospheric 100% primary air injection burners.

A further object is to provide a device having gas-fired direct radiating type burners to which a blower is connected to supply the proper amount of air required to maintain a selected temperature at the surface of an apertured ceramic catalyst burner part.

A further object is to provide a device of this character wherein primary inlet passages extend from a blower to ray heads or burners in such manner that each ray head may inspirate sufficient air to produce radiant surface combustion.

A further object is to provide a device of this character having multiple ray-head-type burners mounted in a self-contained frame to provide a sub-assembly easily removable as needed for servicing.

A further object is to provide a device of this character having a ray head type of burner, wherein the burners are arranged in a multiplicity of pairs with metallic screens spanning portions thereof and utilized to avoid fluttering and pulsating during combustion at a modulated rate of gas supply so as to provide quiet operation of the burner with static radiation therefrom.

A further object is to provide a device of this character wherein a primary air chamber has arranged in conjunction therewith the inspiration of tubes of ray head type burners in such a manner as to make possible the use of a blower and to provide high operating efficiency.

A further object is to provide a device of this character having primary ducts leading from the blower to burners of the direct radiating 100% primary air injection type, wherein branch ducts extend from said primary ducts and discharge air into a heating or broiling compartment for the purpose of purging the compartment of vapors generated during the heating of an object, such as the broiling of meat.

A further object is to provide a broiler having ray head type burners connected to a pressurized primary air chamber from which air is permitted to bleed at a regulated rate into a broiling chamber adjacent the front thereof to form a curtain of air to seal off smoke and vapors from escape at the open front of such chamber.

A further object is to provide a device of this character utilizing ray heat type burners having deflector plates located at the sides thereof and arranged to minimize the build up of temperature of the body of the ray head burners, to minimize the equalization of the temperature of the inner and outer faces of apertured ceramic catalyst plates of said burners, and to cooperate with flue passages for fast removal from a heating compartment of the products of combustion, so as to permit the mounting of a number of ray heads within an insulated structure without causing overheating of the burner parts which would produce flashback and failure.

A further object is to provide a device of this character having a direct radiating 100% primary air injection burner whose total supply of gas and air mixture is inspirated through a venturi tube from an enclosed primary air chamber which can be pressurized if needed to insure the inspiration of sufficient primary air by the burner to provide an efficient low pressure gas-air mixture.

A further object is to provide a device of this character having direct radiation 100% primary air injection burners which are connected to a sealed primary air chamber which is in turn connected by one or more air ducts with a source of air supply located at a remote position with respect to the burners, so as to insure that air entering the burners will be substantially free of impurities and will produce highly efficient operation of the burners.

Other objects will be apparent from the following specification.

Figure 1:
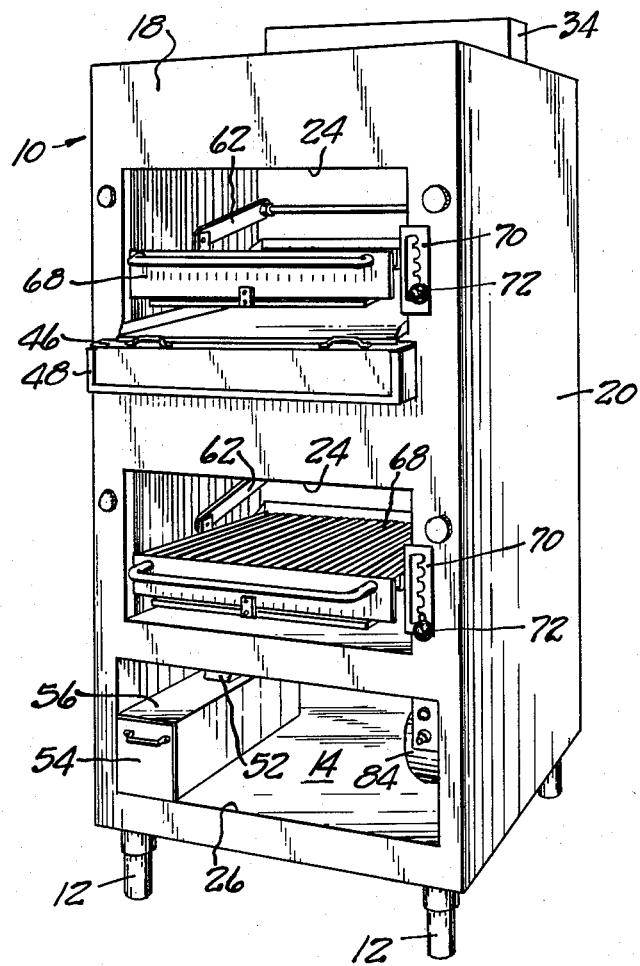
FIG. 1 is a front perspective view illustrating one embodiment of the invention applied in a double deck broiler.
Figure 2:
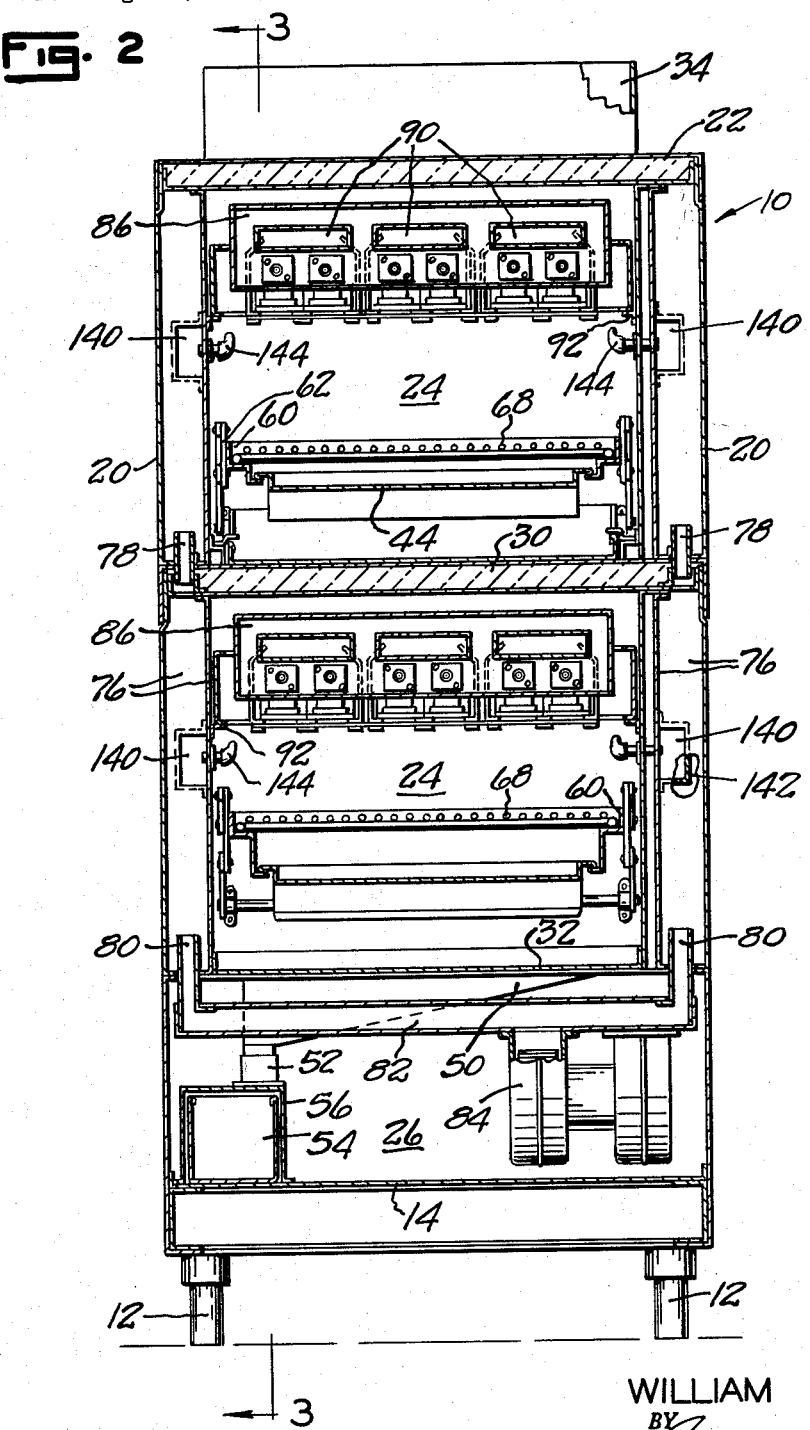
FIG. 2 is a vertical transverse sectional view of the broiler taken on line 2—2 of FIG. 3.
Figure 3:
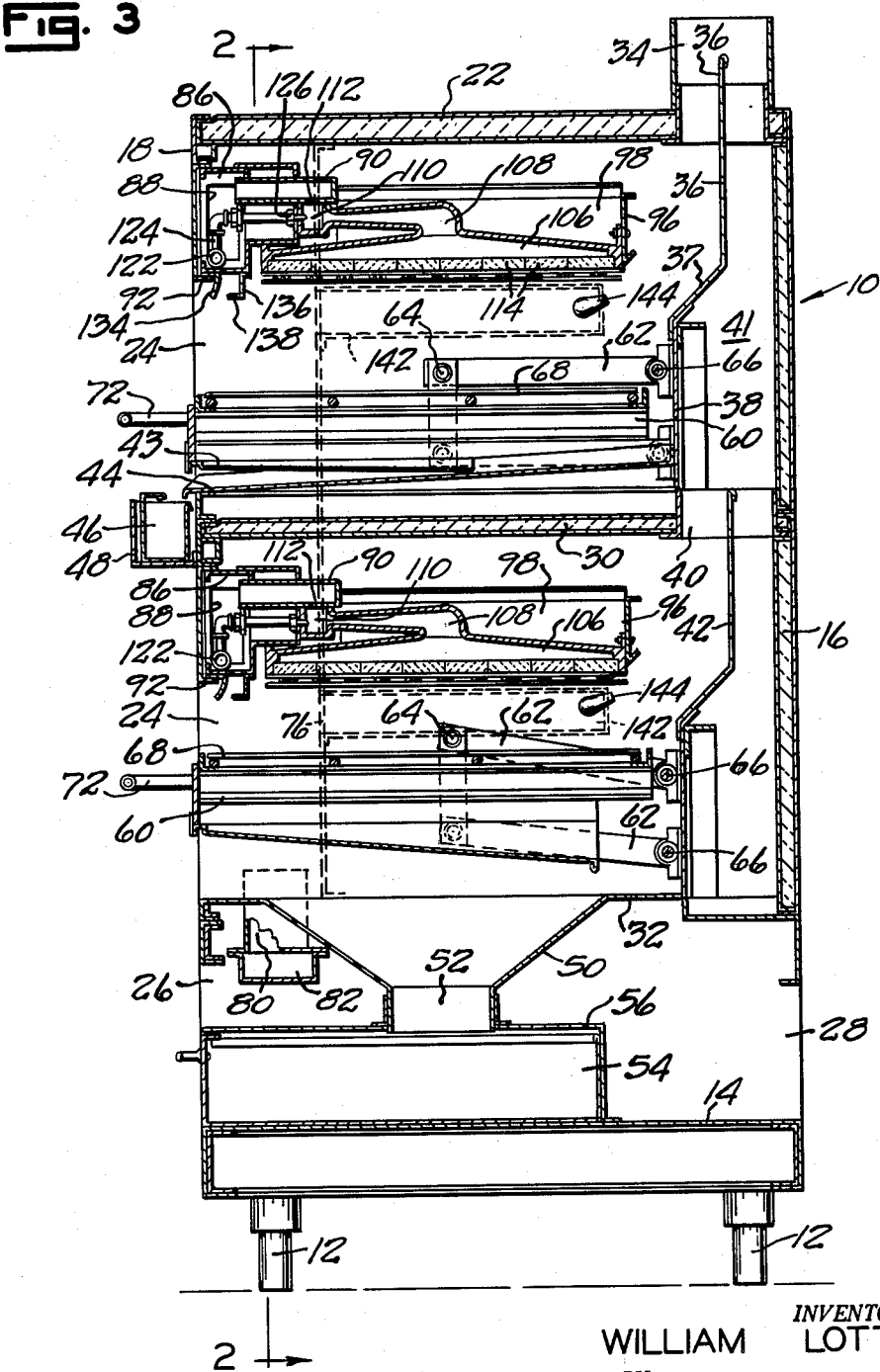
FIG. 3 is a vertical sectional view taken on line 3—3 of FIG. 2.

Referring to the drawings which illustrate one embodiment of the invention, and particularly to FIGS. 1, 2 and 3 thereof, the numeral 10 designates the cabinet or housing of a double-deck broiler which is supported in elevated position upon legs or uprights 12. The housing has a bottom panel 14, a rear panel 16, front panel 18, side panels 20, and top panel 22. The front panel 18 is preferably provided with a pair of spaced openings giving access to spaced broiler compartments 24 and with an air intake opening leading to a blower compartment 26. The rear panel may have an opening 28 communicating with the blower compartment 26 so as to permit air to enter the blower chamber from the rear as well as the front. A partition 30 is located between the top and bottom chambers 24 and a partition 32 forms the bottom of the lower broiling chamber 24 and separates the same from the blower chamber 26. Selected housing walls, such as the rear wall 16, top wall 22, parts of the side walls 20 and the separating partition 30 are preferably insulated.

The top 22 has a flue opening with which communicates a flue or stack 34 which preferably extends substantially full width of the housing. A vertical partition extends centrally through the stack 34 at 36, being offset at 37 and extending full width of the upper broiling compartment so as to define, in connection with a lower wall portion 38, the rear of the upper broiler compartment 24. An opening is formed in the rear of the partition 30 through which a sleeve 40 extends, providing communication between the lower broiling compartment 24 and passage 41 rearwardly of the rear wall 36, 37, 38 of the upper broiling compartment 24 and communicating with the stack 34. If desired, a wall 42 may be extended transversely at the rear of the lower broiler compartment to separate the same from the rear housing wall 16 and to provide a lower broiler compartment 24 of substantially the same cubic capacity and shape as the upper broiler compartment.

The top broiling compartment has inclined bottom panels 43 and 44, and the bottom inclined drain panel 44 preferably extends from the rear wall 38 forwardly to project beyond the front wall of the housing. A drip-collecting receptacle 46 is positioned outwardly of the front wall of the housing and below the outer end of said panel 44 and is mounted on a suitable support 48 in a manner to accommodate ready removal. The bottom panel 32 of the lower broiler compartment 24 preferably has a funnel-shaped wall portion 50 having a depending discharge neck 52 for draining into a drainage collecting drawer 54 slidable within an elongated housing or chamber 56 supported on the bottom 14 of the housing.

Each of the upper and lower broiler compartments 24 has mounted in the lower portion thereof an adjustable grill unit. In the form shown the grills are adjustable vertically at selected elevation. Thus each grill has a grill frame 60 supported intermediate its ends by links or arms 62 pivoted thereto at 64 and pivoted at 66 to brackets carried by the rear walls of the respective broiler compartments, such as the walls 38 and 42. Grill member 68 is preferably slidable upon each grill frame 60. Suitable adjusting means are provided for controlling the elevation of the grill, said means including brackets 70 provided with plural vertically spaced notches and a lever 72 having a hand knob and connected with each grill frame 60 and positioned at selected elevation in a selected notch of the bracket 70.

The housing is provided with an air duct system which preferably is defined in part by duct walls 76 extending vertically at the front portion of both sides 20 thereof from and above the bottom wall 32 to the top 22. Openings are provided in the partition 30 mounting tubes 78 providing communication between the upper and lower parts of the air ducts. The lower end of each air duct or passage has communication with air intake means in chamber 26, as with the upturned end portions 80 of a substantially U-shaped duct having a cross-passage 82 which communicates with a blower 84 which is of the motor-driven type and of any suitable construction for drawing air from the bottom member 26 of the device. If desired, the blower may be provided with filters (not shown) for filtering the air which enters the air duct system.

Figure 4:
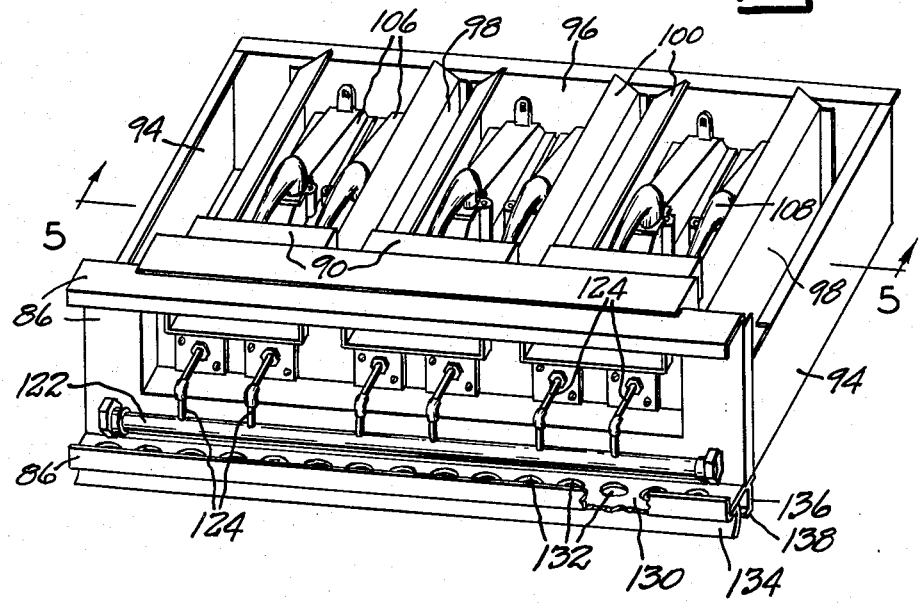
FIG. 4 is a perspective view illustrating a subassembly mounting ray head burner units.
Figure 5:
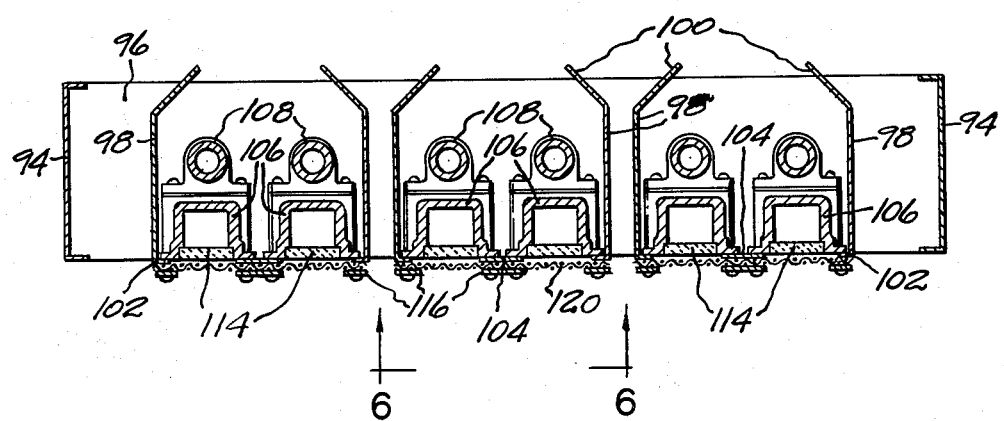
FIG. 5 is a vertical transverse sectional view taken on line 5—5 of FIG. 4.

Adjacent the upper end of each broiler compartment 24 and extending across the front thereof is a structure defining a pressurized primary air chamber 86 which communicates with the vertical air ducts 76 by means of apertures 88. Each primary air chamber 86 has communicating therewith a plurality of air transfer chambers 90. The parts defining the chambers 86 and 90 preferably constitute parts of a sub-assembly as illustrated in FIGS. 4 and 5. Each sub-assembly is mounted in the upper part of a broiler compartment spaced below the top thereof upon brackets 92 or other suitable supports. As shown, each sub-assembly preferably has side walls 94 and a rear wall 96 secured to each other and to the members 86 and 90 to define a rigid structure.

Each of the sub-assemblies includes spaced pairs of substantially vertical deflector shields or plates 98 extending between members 86 and 96 and preferably having upper inturned inclined flanges 100 and lower inturned flanges 102. The flanges 102 of each pair of deflector plates 98 cooperate with plates 104 extending between parts 86 and 96 in the same plane as the flanges 102 for the purpose of supporting the castings or bodies 106 of a pair of ray head type burners extending substantially full length of the sub-assembly. The burner castings 106 are preferably elongated and have an open bottom. Each casting is of progressively varying depth with its maximum cross-sectional dimension mid-length thereof at which midpoint an integral inspiration duct portion 108 projects therefrom and runs substantially parallel thereto to terminate at an inspiration chamber 110 which communicates with the adjacent primary air transfer chamber 90 at opening 112.

Figure 6:
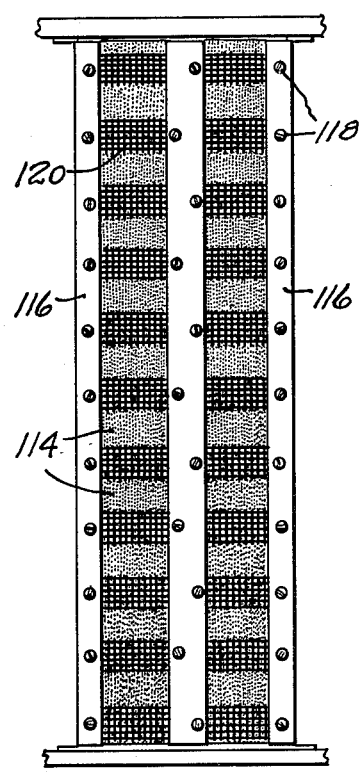
FIG. 6 is a fragmentary face view of a burner subassembly as viewed in the direction of the arrows 6—6 in FIG. 5.
Figure 7:
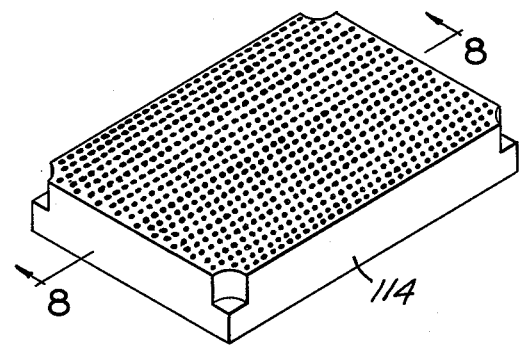
FIG. 7 is a perspective view of an apertured ceramic plate used in the burners illustrated in FIGS. 5 and 6.
Figure 8:
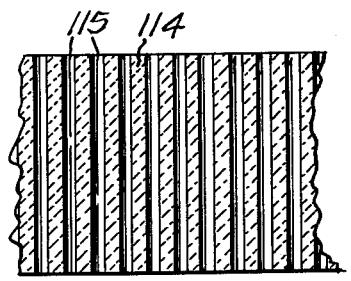
FIG. 8 is an enlarged fragmentary transverse sectional view taken on line 8—8 of FIG. 7.

A plurality of ceramic blocks or plates 114 of the construction illustrated in FIGS. 7 and 8 are mounted in and span the open bottom mouths of the burner heads 106. The ceramic blocks 114 are preferably of the character described in U.S. Patent 2,775,294 and are characterized by a large number of very small passages 115 extending in uniform spacing therethrough. Thus in one form the ceramic blocks are approximately 7/16 inch thick and are provided with approximately 200 ports or passages 115 per square inch. The ceramic blocks 114 are mounted in any suitable manner as by means of mounting strips 116 shown in FIG. 6 anchored by securing screws or like securing means 118 to the frame of the burner housing. The strips 116 also serve to anchor stainless steel or other alloy wire mesh members 120 at uniformly spaced intervals along the length thereof and positioned with the major portion thereof slightly spaced from the bottom surfaces of the ceramic blocks 114, as seen in FIG. 5.

Each sub-assembly preferably includes a gas supply manifold or conduit 122 adapted for connection with a conduit leading to a source of supply of combustible gas. A plurality of conduits 124 branch from the manifold 122 and each terminates in a nozzle or jet 126 which discharges into the inspiration chamber 110 of one of the respective burners.

The bottom wall 130 of the part of each sub-assembly which defines part of the primary air transfer chamber 86 is provided with a longitudinal series of openings or apertures 132 equispaced along the length thereof and positioned adjacent the front wall 18 of the housing. Spaced depending longitudinal flanges 134 and 136 extend lengthwise of the wall 130 adjacent opposite margins of the openings 132. The flanges 134 and 136 are preferably configured, with the front flange 134 preferably being bent slightly in a forward direction, and the rear flange 136 preferably being provided with a lip 138 extending toward flange 134 for restricting the air outlet opening between the same and the flange 134 and serving to direct the discharge into the broiler compartment 24 of air issuing from the openings 132 of the pressurized primary air chamber 86.

Each of the ducts 76 preferably has an opening 140 adjacent and substantially mid-height of each of the broiler compartments 24, and from each of these openings 140 extends a branch duct or passage 142. Each of these branch ducts 142 communicates with an outlet nozzle 144 projecting into the broiler compartment and directed rearwardly and upwardly adjacent the rear of the broiler compartment.

In the use of the device, when gas is applied to the manifold 122, it discharges at the respective nozzles 126 for the burners into the burner inspiration chambers 110. This action serves to inspirate air through the ducts 76, the primary air chamber 86 and the primary air transfer chambers 90 into the burner inspiration chambers 110. In cases where the air chambers or ducts 76 are open to atmosphere, as in cases where blower 84 and tubes 80, 82 leading from the blower to the ducts 76, are omitted, the supply of air for mixture with the fuel gas is provided solely by virtue of the inspirating action of the nozzles. I prefer, however, to employ the blower 84 in order to provide a constant assured adequate source of air supply and also to assure a slight positive pressure in the primary air chamber 86 of a value up to .08 inch of water pressure, and preferably .05 inch of water pressure or less.

It will also be apparent that the operation of the blower 84 producing a slight positive pressure in the ducts 76 and the branch ducts 142 serves to insure the discharge of air into the broiler chambers 24 at the bleed outlets 132 at the front of each broiler chamber and at the purging outlets 144 at the rear of each broiler chamber. The discharge of air at the front outlets 132 provides a curtain of air at the open front of each broiler compartment 24 and extending thereacross. This curtain of air serves to minimize the escape of smoke and vapor, resulting from the broiling of meat, at the front of the broiler compartment. The discharge of air at the purging outlets 144 serves to draw smoke and vapor within the broiler compartments rearwardly toward the stack. In other words, it serves to establish a flow pattern wherein air enters the front of the broiler compartment and carries smoke and vapors with it rather than permitting the exhaust of smoke and vapors through the open front of the broiler compartment.

One of the important advantages of the burner construction shown is the uniformity of radiation of the burners which will result in uniformity of broiling of meat, regardless of the location thereof upon the grill 68. This uniformity of radiation results from the arrangement of the burners in pairs extending full length of the sub-frames, and the provision of ceramic plates 114 extending full length of each burner. It will be observed that the burners of each pair are located side by side with only a slight spacing between adjacent pairs of burners sufficient to provide air passages between adjacent deflectors or shields 98 and between the outer deflector shields 98 and the side members 94 of the sub-assembly. The heat generated within the broiler compartments 24 by the burners is prevented from impinging on the burner bodies 106—108 to the extent that currents of heated air and vapors rising by convection from the broiler chamber 24 past the burners to the upper part of the broiler chamber above the burners contact only the deflector shields 98 and not the burner bodies 106. Thus there is a substantial difference in temperature between the bottom outer surfaces of the apertured ceramic catalyst blocks 114 and the upper inner surfaces thereof. In this connection the temperatures achieved at the bottom outer faces of the burner blocks 114 are in the order of 1600 degrees Fahrenheit or more when the burners are functioning. Maintenance of a substantial difference in temperature between this high temperature and the temperature in the interior of the burner housing produces economical and efficient burner operation and is important to insure the smooth injection of the air and gas mixture through the burner inspiration ducts 108 into the burner housing 106.

The deflector shields 98 in conjunction with the transversely elongated cross-section of the flue passage 34, and related arrangement such as the bleed ports 132 and the purging air outlets 144, produce fast removal of the products of combustion. This is important inasmuch as it permits the mounting of a number of the burners within an insulated housing 10 without danger of ultimate overheating of the ceramic blocks 114 or of the burner bodies 106 which could produce flashback and burner failure. A further important characteristic of the construction is that the combination of the burner mounting sub-assembly and its position within a broiler compartment spaced below the top thereof and in free communication with the stack or flue provides a semi-enclosed upper flue chamber for proper guidance and removal of the products of combustion and of broiling which move in the chamber by convection.

The construction also makes practical and economical a double-deck arrangement of broiler compartments with assurance of equal efficiency of operation in each and thus assures economy of space in a kitchen. Important in connection with the factors producing such efficiency is the provision of two air supply ducts in the housing communicating with opposite ends of the pressurized primary air chamber 86, and thus providing a substantial balance of air supply to each burner in each of the two broiler compartments.

A further factor of importance in connection with the provision of elongated vertical primary air ducts 76 in the construction is that air intake is remote from the broiler chambers. It has been found that a direct radiating 100% primary air injection burner or ray head of the type here shown, which requires its total supply of gas and air to be inspirated through its venturi tube, is basically very sensitive to contamination of its air supply. The remote location of the intake of the duct 76 assists in insuring cleanliness of the air supply. Also, the location of the air intake remote from the broiler chamber makes simple the provision of filters below the broiler chambers, as adjacent the fan 84 in the air supply system. Cleanliness of the air supply to the burners maintains the air ducts clean and insures uniform inspiration of air for uniform operation of the burners as long as a consistent gas supply is available. Such uniformity of operation is a distinct advantage over prior gas-burning equipment, and particularly over prior gas-fired broiler constructions.

The broiler is particularly advantageous for other reasons. The burners produce infra red heat which heats only the objects on which it impinges and not the atmosphere through which it passes. This infra red heating reduces the amount of time required to properly broil meat by a substantial extent with a saving of approximately one-half the time required by conventional broilers. This increases the operating capacity of the device. Furthermore, the efficiency of the device is not reduced by the presence of smoke and grease or vapor created by the broiling during peak load operations inasmuch as the broiling results from the infra red heat and inasmuch as no secondary air is required as is conventional. Another advantage of the unit is that burners of this character require only 90 seconds for preheating, so that the broiler need not be in operation when not in use, as is commonly necessary with broilers using other types of burners which may require much longer periods of preheating time.

While the preferred embodiment of the invention is illustrated and described, it will be understood that changes in the construction may be made within the scope of the appended claims without departing from the spirit of the invention.

I claim:

1. A broiler comprising a housing having a flue and a broiler compartment therein open at its front and communicating with said flue, a grill in the lower part of said compartment, a plurality of gas-fired burners mounted in the upper part of said compartment, said burners being of the type generating infra red heat, and air supply means for said burners including a substantially sealed primary air chamber supplying all burners and an elongated air supply duct communicating with and adapted to pressurize said primary air chamber at substantially constant pressure and having an air inlet spaced from and below said broiler compartment.

2. A broiler comprising a housing having a flue and a broiler compartment therein open at its front and communicating with said flue, a grill in the lower part of said compartment, a plurality of gas-fired burners mounted in the upper part of said compartment, said burners being of the type generating infra red heat, and air supply means for said burners including a substantially sealed pressurized primary air chamber supplying all burners at substantially constant pressure and an elongated air supply duct communicating with said primary air chamber and having an air inlet spaced from and below said broiler compartment, each burner having an inspiration tube communicating with said primary air chamber, and gas supply means for discharging gas into said inspiration tube adjacent the connection between said inspiration tube and primary air chamber.

3. A broiler comprising a housing having a flue and a broiler compartment therein open at its front and communicating with said flue, a grill in the lower part of said compartment, a plurality of gas-fired burners mounted in the upper part of said compartment, said burners being of the type generating infra red heat, and air supply means for said burners including a substantially sealed pressurized primary air chamber supplying all burners at substantially constant pressure and an elongated air supply duct communicating with said primary air chamber and having an air inlet spaced from and below said broiler compartment, and a blower for supplying air to said duct.

4. A broiler as defined in claim 1, wherein said primary air chamber extends transversely of said broiler compartment and an air supply duct is connected to said chamber at each end thereof.

5. A broiler as defined in claim 1, wherein two vertically spaced broiler compartments are arranged in said housing and each has a transverse primary air chamber and a plurality of burners therein, said housing having two vertical air ducts at opposite sides thereof, each primary air chamber communicating with both air ducts.

6. A broiler comprising a housing having a flue and a broiler compartment therein open at its front and communicating with said flue, a grill in the lower part of said compartment, a plurality of gas-fired burners mounted in the upper part of said compartment, said burners being of the type generating infra red heat substantially uniformly throughout the bottom area thereof, a substantially sealed primary air chamber suplying all burners, means supplying air under substantially uniform pressure to said primary air chamber, and means mounting said burners in predetermined spaced relation in a sub-assembly removable from said compartment to accommodate discharge of products of combustion upwardly between said burners relative to the bottom surfaces thereof.

7. A broiler comprising a housing having a flue and a broiler compartment therein open at its front end communicating with said flue, a grill in the lower part of said compartment, a plurality of gas-fired burners mounted in the upper part of said compartment, said burners having apertured ceramic bottom plates, a substantially sealed primary air chamber supplying all burners, means supplying air under pressure to said primary air chamber, means mounting said burners in spaced relation, and deflection shields extending substantially full length of said burners spaced from the sides of the burners and defining elongated vertical passages open at top and bottom thereof and located between spaced burners, said shields and burners being spaced below the top of said compartment.

8. A broiler comprising a housing having a flue and a broiler compartment therein open at its front and communicating with said flue, a grill in the lower part of said compartment, a plurality of gas-fired burners mounted in the upper part of said compartment, said burners having apertured ceramic bottom plates and spaced parallel elongated chambered body portions mounting said ceramic plates, and deflector plates extending substantially full length alongside and spaced from selected burner body portions and cooperating to define open-ended elongated vertical passages for convection flow of heated fluids past said burner body portions with minimum heat transfer to said burner body portions.

9. A broiler comprising a housing having a flue and a broiler compartment therein open at its front and communicating with said flue, a grill in the lower part of said compartment, an air supply duct in said housing, and a burner assembly removably mounted in the upper part of said compartment, said assembly including a frame and a plurality of spaced substantially parallel burners, a part of said frame cooperating with said housing to define a primary air chamber communicating with said air supply duct, spaced pairs of vertical deflector plates extending substantially full length of said burners and defining elongated passages in said frame, said burners being mounted in said frame spaced from and between said deflector plates and closing the space between said deflector plates of each pair, said burners being connected to said primary air chamber and being of the direct radiating 100% primary air injection type.

10. A broiler comprising a housing having a flue and a broiler compartment therein open at its front and communicating with said flue, a grill in the lower part of said compartment, a plurality of gas-fired burners mounted in the upper part of said compartment, said burners being of the direct radiating 100% primary air injection type and a pressurized primary air chamber supplying all burners at substantially uniform air pressure.

11. A broiler comprising a housing having a flue and a broiler compartment therein open at its front and communicating with said flue, a grill in the lower part of said compartment, a plurality of gas-fired burners mounted in the upper part of said compartment, said burners being of the direct radiating 100% primary air injection type and a pressurized primary air chamber supplying all burners at substantially uniform pressure, said primary air chamber extending across said compartment above and adjacent said front opening, and a plurality of substantially uniformly spaced air outlet openings in the bottom of said primary air chamber to form an air curtain at the open part of said compartment.

12. A broiler comprising a housing having a flue and a broiler compartment therein open at its front and communicating with said flue, a grill in the lower part of said compartment, a plurality of gas-fired burners mounted in the upper part of said compartment, said burners being of the direct radiating 100% primary air injection type and a pressurized primary air chamber supplying all burners at substantially uniform pressure, said primary air chamber extending across said compartment above and adjacent said front opening, and a plurality of substantially uniformly spaced air outlet openings in the bottom of said primary air chamber, and spaced longitudinal flanges depending from said primary air chamber at opposite sides of said outlet openings to direct air into said compartment.

13. A broiler comprising a housing having a flue and a broiler compartment therein open at its front and communicating with said flue, a grill in the lower part of said compartment, a plurality of gas-fired burners mounted in the upper part of said compartment, said burners being of the direct radiating 100% primary air injection type, and pressurized air supply means for said burners, said air supply means including a substantially sealed primary air chamber supplying said burners at substantially uniform pressure and connected by a supply duct with a blower remote from said primary air chamber.

14. A broiler comprising a housing having a flue and a broiler compartment therein open at its front and communicating with said flue, a grill in the lower part of said compartment, a plurality of gas-fired burners mounted in the upper part of said compartment, said burners being of the direct radiating 100% primary air injection type, and pressurized air supply means for said burners, said air supply means including a substantially sealed primary air chamber supplying said burners at substantially uniform pressure and connected by a supply duct with a blower remote from said primary air chamber, said primary air chamber having an outlet for discharging a curtain of air across the front of said chamber.

15. A broiler comprising a housing having a flue and a broiler compartment therein open at its front and communicating with said flue, a grill in the lower part of said compartment, a plurality of gas-fired burners mounted in the upper part of said compartment, said burners being of the direct radiating 100% primary air injection type, pressurized air supply means for said burners having a primary air chamber supplying said burners at substantially uniform pressure and a pressurized air duct supplying air to said chamber, a passage branching from said duct, and means discharging purging air from said branch passage into said compartment.

16. A broiler comprising a housing having a flue and a broiler compartment therein open at its front and communicating with said flue, a grill in the lower part of said compartment, a plurality of gas-fired burners mounted in the upper part of said compartment, said burners being of the direct radiating 100% primary air injection type, a pressurized air supply for said chamber having a primary air chamber supplying said burners and a supply duct, said primary air chamber having an outlet for discharging a curtain of air across the front of said chamber, and an outlet communicating with said duct for discharging purging air into said compartment adjacent said flue.

17. In combination, a housing having an open-front chamber having a food containing portion and a flue communicating with said chamber, a plurality of gas-fired burners of the type generating infra red heat, said burners being elongated and extending across said chamber and being spaced to direct infra red heat substantially uniformly throughout said food containing portion of said chamber, a primary air chamber supplying to all burners air sufficient to support combustion, and means for supplying air to said air chamber at a low positive substantially uniform pressure.

18. In combination, a housing having an open-front chamber and a flue communicating with said chamber, a food support in the lower part of said chamber, a plurality of gas-fired burners in the upper part of said chamber and of the type generating and directing downwardly toward said food support infra red heat rays, said burners being elongated to extend across said chamber and spaced to apply infra red heat substantially uniformly at said food support, gas supply means for each burner including a jet, a primary air chamber having a plurality of outlets communicating with said respective burners, each jet discharging at an air chamber outlet to inspirate to said burners sufficient air to support combustion, and means for supplying air to said chamber at a low positive pressure whereby substantially uniform air pressure is supplied at all outlets.

References Cited in the file of this patent
UNITED STATES PATENTS

| | | |
|---|---|---|
| 1,505,273 | Maul | Aug. 19, 1924 |
| 1,677,156 | Vaughn | July 17, 1928 |
| 2,125,989 | Burch | Aug. 9, 1938 |
| 2,143,994 | McGlone | Jan. 17, 1939 |
| 2,167,047 | Jackson et al. | July 25, 1939 |
| 2,182,734 | O'Dowd | Dec. 5, 1939 |
| 2,283,853 | Frick | May 19, 1942 |
| 2,617,404 | Prather | Nov. 11, 1952 |
| 2,775,294 | Schwank | Dec. 25, 1956 |
| 2,848,990 | Haedike et al. | Aug. 26, 1958 |
| 2,949,524 | Scarioni | Aug. 16, 1960 |
| 2,987,118 | Brown | June 6, 1961 |
| 2,997,941 | Phelan et al. | Aug. 29, 1961 |

FOREIGN PATENTS

| | | |
|---|---|---|
| 436,745 | France | Feb. 1, 1912 |